(12) United States Patent
Chinn et al.

(10) Patent No.: US 9,975,318 B2
(45) Date of Patent: May 22, 2018

(54) PAPER LAMINATES MADE FROM DECOR PAPER HAVING IMPROVED OPTICAL PERFORMANCE COMPRISING TREATED INORGANIC PARTICLES

(71) Applicant: CHEMOURS COMPANY TT LLC, Wilmington, DE (US)

(72) Inventors: Mitchell Scott Chinn, Wilmington, DE (US); Franck Andre Vanhecke, Lebbeke (BE)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 61 days.

(21) Appl. No.: 14/372,542

(22) PCT Filed: Jan. 9, 2013

(86) PCT No.: PCT/US2013/020727
§ 371 (c)(1),
(2) Date: Jul. 16, 2014

(87) PCT Pub. No.: WO2013/109436
PCT Pub. Date: Jul. 25, 2013

(65) Prior Publication Data
US 2014/0363662 A1   Dec. 11, 2014

Related U.S. Application Data

(60) Provisional application No. 61/586,940, filed on Jan. 16, 2012.

(51) Int. Cl.
| | | |
|---|---|---|
| *B32B 29/00* | (2006.01) | |
| *D21H 23/00* | (2006.01) | |
| *D21H 27/26* | (2006.01) | |
| *D21H 27/30* | (2006.01) | |
| *D21H 17/44* | (2006.01) | |
| *D21H 17/67* | (2006.01) | |
| *D21H 17/69* | (2006.01) | |

(52) U.S. Cl.
CPC ............ *B32B 29/005* (2013.01); *B32B 29/00* (2013.01); *D21H 17/44* (2013.01); *D21H 17/675* (2013.01); *D21H 17/69* (2013.01); *D21H 23/00* (2013.01); *D21H 27/26* (2013.01); *D21H 27/30* (2013.01); *B32B 2250/02* (2013.01); *B32B 2250/24* (2013.01); *B32B 2250/26* (2013.01); *B32B 2260/028* (2013.01); *B32B 2260/046* (2013.01); *B32B 2305/076* (2013.01); *B32B 2386/00* (2013.01); *B32B 2419/00* (2013.01); *B32B 2479/00* (2013.01); *Y10T 428/256* (2015.01); *Y10T 428/31964* (2015.04)

(58) Field of Classification Search
None
See application file for complete search history.

(56) References Cited

U.S. PATENT DOCUMENTS

| | | | |
|---|---|---|---|
| 3,409,501 A * | 11/1968 | Siuta | 162/166 |
| 4,874,466 A | 10/1989 | Savino | |
| 5,075,033 A | 12/1991 | Cody et al. | |
| 5,147,507 A | 9/1992 | Gill | |
| 5,562,764 A | 10/1996 | Gonzalez | |
| 5,679,219 A | 10/1997 | Harms et al. | |
| 5,992,120 A | 11/1999 | Meguro | |
| 6,599,592 B1 | 7/2003 | Schulz | |
| 6,706,372 B2 | 3/2004 | Schulz | |
| 6,783,631 B2 | 8/2004 | Schulz | |
| 6,890,652 B2 | 5/2005 | Schulz | |
| 7,029,648 B2 | 4/2006 | Subramanian et al. | |
| 7,264,672 B1 * | 9/2007 | Trabzuni et al. | 106/443 |
| 9,023,179 B2 | 5/2015 | Chinn et al. | |
| 2002/0022117 A1 * | 2/2002 | Kitamura et al. | 428/195 |
| 2003/0089476 A1 | 5/2003 | Schulz | |
| 2004/0137254 A1 * | 7/2004 | Schulz | 428/537.5 |
| 2006/0157212 A1 * | 7/2006 | Berube et al. | 162/181.8 |
| 2007/0175363 A1 * | 8/2007 | Blumel et al. | 106/442 |
| 2008/0108740 A1 * | 5/2008 | Evers | C08K 9/08 524/431 |
| 2015/0330028 A1 | 11/2015 | Chinn et al. | |

FOREIGN PATENT DOCUMENTS

| | | |
|---|---|---|
| SU | 896138 | 1/1982 |
| WO | 9935335 | 7/1999 |

OTHER PUBLICATIONS

EP1044304—machine translation, equivalent of WO9935335, Decorative Paper Sheet for Decorative Laminates Arjo Wiggins, Jul. 15, 1999.
SU896138—English Abstract, Paper and Cardboard Pulp Compsn., Khan, Jan. 9, 1982.
Ulmann's Encyclopedia of Industrial Chemistry, 2012 Wiley-VCH Verlag GmbH & Co. Silica, Section 6, pp. 1, 478 Through 485.

* cited by examiner

*Primary Examiner* — Chinessa T Golden

(57) ABSTRACT

The disclosure provides a paper laminate comprising a décor paper prepared from a dispersion having improved optical performance without negatively impacting mechanical strength, wherein the dispersion comprises a $TiO_2$ particle slurry comprising a treated $TiO_2$ particle having a surface area of at least about 30 $m^2$/g, and a cationic polymer; wherein the treatment comprises an oxide of silicon, aluminum, phosphorus or mixtures thereof; and the treatment is present in the amount of at least 15% based on the total weight of the treated titanium dioxide particle; paper pulp; and a cationic polymer; wherein the cationic polymer in the slurry and the cationic polymer in the dispersion are compatible; wherein for equal optical performance, the amount of treated $TiO_2$ particle in the dispersion is reduced by about 10% when compared to a dispersion not comprising the treated $TiO_2$ particle of (a).

19 Claims, No Drawings

PAPER LAMINATES MADE FROM DECOR PAPER HAVING IMPROVED OPTICAL PERFORMANCE COMPRISING TREATED INORGANIC PARTICLES

BACKGROUND OF THE DISCLOSURE

The present disclosure pertains to a décor paper and paper laminates made from such paper. More specifically, the décor paper comprises a treated inorganic core particle, in particular a treated titanium dioxide particle, having improved opacity in highly loaded paper systems.

Paper laminates are in general well-known in the art, being suitable for a variety of uses including table and desk tops, countertops, wall panels, floor surfacing, and the like. Paper laminates have such a wide variety of uses because they can be made to be extremely durable, and can be also made to resemble (both in appearance and texture) a wide variety of construction materials, including wood, stone, marble and tile, and they can be decorated to carry images and colors.

Typically, the paper laminates are made from décor paper by impregnating the paper with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the paper laminate.

Decorative paper laminates can be made by utilizing a decorated paper layer as the visible paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Décor papers typically comprise fillers such as titanium dioxide to increase brightness and opacity to the paper. Typically, these fillers are incorporated into the fibrous paper web by wet end addition.

In light colored and bright white décor paper applications, $TiO_2$ concentrations of 30-45% by weight of pigment are needed to provide the desired color and or opacity. However, at these high loading levels, the efficiency at which $TiO_2$ functions as an opacifying agent deteriorates due to the "crowding effect" of the pigment. That is, twice the amount of pigment use based on a less concentrated paper system (i.e. one that comprises 20% $TiO_2$ by weight), will not double the opacity in a highly loaded paper. In fact, the opacity fails short due to the crowding effect. Hence décor paper manufactures incur a cost penalty to reach the desired opacity in highly loaded white papers. Thus the need exists for a $TiO_2$ pigment that can maintain its opacifying efficiency even in highly loaded paper systems.

SUMMARY OF THE DISCLOSURE

In a first aspect, the disclosure provides a dispersion for making décor paper having improved optical performance without negatively impacting paper mechanical strength comprising:
(a) a $TiO_2$ pigment slurry comprising a treated $TiO_2$ pigment having a surface area of at least about 30 m²/g, and a cationic polymer; wherein the treatment comprises an oxide of silicon, aluminum, phosphorus or mixtures thereof; and the treatment is present in the amount of at least 15% based on the total weight of the treated titanium dioxide pigment;
(b) paper pulp; and
(c) a cationic polymer; wherein the cationic polymer in the slurry and the cationic polymer in the dispersion are compatible; wherein for equal optical performance, the amount of treated $TiO_2$ pigment in the dispersion is reduced by about 10% when compared to a dispersion not comprising the treated $TiO_2$ pigment of (a).

In the first aspect, the cationic polymer in the slurry is a urea-formaldehyde resin, a melamine-formaldehyde resin, a cationic polyacrylamide polymer, a polydialkyllammonium polymer, a polyacrylamide-polydialkylammonium copolymer, or a polyamide-polyamine-epichlorhydrin resin.

In the first aspect, the cationic polymer in the dispersion (c) is a urea-formaldehyde resin, a melamine-formaldehyde resin or a polyamide-polyamine-epichlorhydrin resin.

In a second aspect, the disclosure relates to a paper laminate comprising a décor paper wherein the décor paper comprises a dispersion having improved optical performance without negatively impacting mechanical paper strength comprising:
(a) a $TiO_2$ pigment slurry comprising a treated $TiO_2$ pigment having a surface area of at least about 30 m²/g, and a cationic polymer; wherein the treatment comprises an oxide of silicon, aluminum, phosphorus or mixtures thereof; and the treatment is present in the amount of at least 15% based on the total weight of the treated titanium dioxide pigment;
(b) paper pulp; and
(c) a cationic polymer; wherein the cationic polymer in the slurry and the cationic polymer in the dispersion are compatible; wherein for equal optical performance, the amount of treated $TiO_2$ pigment in the dispersion is reduced by about 10% when compared to a dispersion not comprising the treated $TiO_2$ pigment of (a).

In the second aspect, the disclosure provides a paper laminate further comprising kraft paper.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "$TiO_2$ particle", "the $TiO_2$ particle", or "a $TiO_2$ particle" also includes a plurality of $TiO_2$ particles.

This disclosure relates to an inorganic core particle, typically inorganic metal oxide or mixed metal oxide pigment particles, more typically a titanium dioxide particle that may be a pigment or a nanoparticle, wherein the inorganic core particles, typically inorganic metal oxide or mixed metal oxide particles, more typically titanium dioxide particles having improve opacity in highly loaded paper systems.

Titanium Dioxide Particle

It is contemplated that the titanium dioxide particle, and in particular titanium dioxide pigment particles are treated as per this disclosure. The total amount of the treatment which may be an oxide of silicon, aluminum, or mixtures thereof is at least about 15%, based on the total weight of the treated titanium dioxide particle. Typically the silica treatment level is at least about 6%, more typically about 6 about 14%, and still more typically about 9.5 about 12%. The alumina treatment level is about 4-about 8%, more typically about 5.5 to about 6%, based on the total weight of the treated titanium dioxide particle. By titanium dioxide particle it is meant a particulate material that becomes dispersed throughout a final product such as a paper laminate composition and imparts color and opacity to it. More typically, the titanium dioxide ($TiO_2$) particle is pigmentary.

Titanium dioxide ($TiO_2$) particles useful in the present disclosure may be in the rutile or anatase crystalline form. They are commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The particle may be a pigment or nanoparticle, more typically pigment.

By "pigment" it is meant that the titanium dioxide particles have an average size of less than 1 micron. Typically, the particles have an average size of from about 0.020 to about 0.95 microns, more typically, about 0.050 to about 0.75 microns and most typically about 0.075 to about 0.50 microns. By "nanoparticle" it is meant that the primary titanium dioxide particles have a median primary particle size of greater than about 70 nm, more typically about 70 nm to about 135 nm and still more typically about 90 nm to about 120 cm. Dynamic light scattering, an optical technique that measures the particle size distribution in liquid suspension, shows that typically 80% of produced particles have diameters less than 164 nm.

Process for Preparing Treated Titanium Dioxide Particles

In one embodiment, the process for preparing a treated titanium dioxide ($TiO_2$) particle having improved opacity comprises heating a slurry comprising porous silica treated titanium dioxide particle and water at a temperature of at least about 90° C., more typically about 93 to about 97° C., still more typically about 95 to about 97° C. The silica application can be by deposition of pyrogenic silica onto pyrogenic titanium dioxide particle, or by co-oxygenation of silicon tetrachloride with titanium tetrachloride, or by deposition via condensed phase aqueous oxide.

In a specific embodiment, the slurry comprising silica treated titanium dioxide particle and water is prepared by a process comprising the following steps that include providing a slurry of titanium dioxide particle in water; wherein typically $TiO_2$ is present in the amount of 25 to about 35% by weight, more typically about 30% by weight, based on the total weight of the slurry. This is followed by heating the slurry to about 30 to about 40° C., more typically 33-37° C., and adjusting the pH to about 3.5 to about 7.5, more typically about 5.0 to about 6.5. Soluble silicates such as sodium or potassium silicate are then added to the slurry while maintaining the pH between about 3.5 and about 7.5, more typically about 5.0 to about 6.5; followed by stirring for at least about 5 min and typically at least about 10 minutes, but no more than 15 minutes, to facilitate silica precipitation onto the titanium dioxide particle. Commercially available water soluble sodium silicates with $SiO_2/Na_2O$ weight ratios from about 1.6 to about 3.75 and varying from 32 to 54% by weight of solids, with or without further dilution are the most practical. To apply a porous silica to the titanium dioxide particle, the slurry should typically be acidic during the addition of the effective portion of the soluble silicate. The acid used may be any acid, such as HCl, $H_2SO_4$, $HNO_3$ or $H_3PO_4$ having a dissociation constant sufficiently high to precipitate silica and used in an amount sufficient to maintain an acid condition in the slurry. Compounds such as $TiOSO_4$ or $TiCl_4$ which hydrolyze to form acid may also be used. Alternative to adding the entire acid first, the soluble silicate and the acid may be added simultaneously as long as the acidity of the slurry is typically maintained at a pH of below about 7.5. After addition of the acid, the slurry should be maintained at a temperature of no greater than 50° C. for at least 30 minutes before proceeding with further additions.

The treatment corresponds to about 6 to about 14% by weight of silica, more typically about 9.5 to about 12.0%, and still more typically 10.5% based on the total weight of the titanium dioxide particle, and in particular the titanium dioxide core particle. The amounts of deposited (non-metal and metal) oxides allow control of the isoelectric point between 5.0 and 7.0 which can be beneficial in facilitating the dispersion and/or flocculation of the particulate compositions during plant processing and décor paper production.

An alternate method of adding a silica treatment to the $TiO_2$ particle is by deposition of pyrogenic silica onto pyrogenic titanium dioxide particle, as described in U.S. Pat. No. 5,992,120, or by co-oxygenation of silicon tetrachloride with titanium tetrachloride, as described in U.S. Pat. No. 5,562,764, and U.S. Pat. No. 7,029,648 which are incorporated herein by reference.

The slurry comprising dense silica treated titanium dioxide particles and water is heated at a temperature of at least about 90° C., more typically about 93 to about 97° C., still more typically about 95 to about 97° C. The second treatment comprises precipitated aluminum oxide or alumina. This treatment is porous, and is typically applied from a solution of soluble alumina source, such as a soluble aluminate, using techniques known to one skilled in the art. In a specific embodiment, a soluble alumina source, such as a soluble aluminate, is added to the slurry comprising silica treated titanium dioxide while maintaining the pH at about 7.0 to 10.0, more typically 8.5 to about 9.5 to form an alumina treatment on the porous silica treated titanium dioxide particle. By "soluble alumina source" is meant alkali metal salts of aluminate anions, for example, sodium or potassium aluminate. Alternatively, the soluble alumina source may be acidic, such as for example aluminum chloride or aluminum sulfate, in which case the pH is controlled using a base rather than an acid. The treated titanium dioxide particle does not comprise dense silica or alumina treatments.

The porous alumina treatment is present in the amount of about 4.0% to about 8.0%; more typically about 5.0% to about 7.5%, still more typically 5.8% based on the total weight of the titanium dioxide particle. Because substantially all of the alumina that is precipitated finds its way to a treatment on the titanium dioxide particles, it typically is only necessary to provide that amount of soluble alumina source, such as a soluble aluminate, to the slurry liquid which will result, after precipitation, in the appropriate degree of treatment Typically, the particle to particle surface treatments are substantially homogenous. By this we mean that each core particle has attached to its surface an amount of alumina and silica such that the variability in alumina and silica levels among particles is so low as to make all particles interact with water, organic solvent or dispersant molecules in the same manner (that is, all particles interact with their chemical environment in a common manner and to a common extent). Typically, the treated titanium dioxide particles are completely dispersed in the water to form a slurry in less than 10 minutes, more typically less than about 5 minutes. By "completely dispersed" we mean that the dispersion is composed of individual particles or small groups of particles created during the particle formation stage (hard aggregates) and that all soft agglomerates have been reduced to individual particles.

After treatment according to this process the pigment is recovered by known procedures including neutralization of the slurry and if necessary, filtration, washing, drying and frequently a dry grinding step such as micronizing. Drying is not necessary, however, as a thick slurry of the product can be used directly in preparing paper dispersions where water is the liquid phase.

Applications

The treated titanium dioxide particles may be used in paper laminates. The paper laminates of this disclosure are useful as flooring, furniture, countertops, artificial wood surface, and artificial stone surface.

Décor Paper

Décor paper may contain fillers such as titanium dioxide prepared as described above and also additional fillers. Some examples of other fillers include talcum, zinc oxide, kaolin, calcium carbonate and mixtures thereof.

The filler component of the decorative paper can be about 10 to about 65% by weight, in particular 30 to 45% by weight, based on the total weight of the décor paper. The basis weight of the décor paper base can be in the range of 30 to about 300 g/m$^2$, and in particular 90 to 110 g/m$^2$. The basis weights are selected as a function of the particular application.

Coniferous wood pulps (long fiber pulps) or hardwood pulps such as eucalyptus (short fibered pulps) and mixtures thereof are useful as pulps in the manufacture of décor paper base. It is also possible to use cotton fibers or mixtures all these types of pulps. A mixture of coniferous wood and hardwood pulps in a ratio of about 10:90 to about 90:10, and in particular about 30:70 to about 70:30 can be useful. The pulp can have a degree of beating of 20° to about 60° SR according to Schopper-Riegler.

The décor paper may also contain a cationic polymer that may comprise an epichlorohydrin and tertiary amine or a quaternary ammonium compound such as chlorohydroxypropyl trimethyl ammonium chloride or glycidyl trimethyl ammonium chloride. Most typically the cationic polymer is a quaternary ammonium compound. Cationic polymers such as wet strength enhancing agents that include polyamide/polyamine epichlorohydrin resins, other polyamine derivatives or polyamide derivatives, cationic polyacrylates, modified melamine formaldehyde resins or cationized starches are also useful and can be added to form the dispersion. Other resins include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly(meth)acrylates and/or unsaturated polyester resins. The cationic polymer is present in the amount of about 0.5 to about 1.5%, based on the dry polymer weight to the total dry weight pulp fibers used in the paper.

Retention aids, wet-strength, retention, sizing (internal and surface) and fixing agents and other substances such as organic and inorganic colored pigments, dyes, optical brighteners and dispersants may also be useful in forming the dispersions and may also be added as required to achieve the desired end properties of the paper. Retention aids are added in order to minimize losses of titanium dioxide and other fine components during the papermaking process, which adds cost, as do the use of other additives such as wet-strength agents.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. No. 5,679,219, U.S. Pat. No. 6,706,372 and U.S. Pat. No. 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide that is, in a relative sense, expensive in nature.

The treated titanium dioxide particle can be used to prepare the décor paper in any of the customary ways, wherein at least a portion of the titanium dioxide pigment typically used in such papermaking is replaced to with the treated titanium dioxide pigment.

As indicated above, the décor paper in accordance with the present disclosure is an opaque, cellulose pulp-based sheet containing a titanium dioxide pigment component in an amount of about 45 wt % or less, more typically from about 10 wt % to about 45 wt %, and still more typically from about 25 wt % to about 42 wt %, wherein the titanium dioxide pigment component comprises the treated titanium dioxide particle of this disclosure. In one typical embodiment, the titanium dioxide pigment component comprises at least about 25 wt %, and more typically at least about 40 wt % (based on the weight of the titanium dioxide pigment component) of the treated titanium dioxide pigment of this disclosure. In another typical embodiment, the titanium dioxide pigment component consists essentially of the treated titanium dioxide pigment of this disclosure. In yet another typical embodiment, the titanium dioxide pigment component comprises substantially only the treated titanium dioxide pigment of this disclosure.

Paper Laminates

Paper laminates in accordance with the present disclosure can be made by any of the conventional processes well known to those of ordinary skill in the relevant art, as described in many of the previously incorporated references.

Typically, the process of making paper laminates begins with raw materials—impregnating resins such as phenolic and melamine resins, brown paper (such as kraft paper) and high-grade print paper (a laminate paper in accordance with the present disclosure).

The brown paper serves as a carrier for the impregnating resins, and lends reinforcing strength and thickness to the finished laminate. The high-grade paper is the decorative sheet, for example, a solid color, a printed pattern or a printed wood grain.

In an industrial-scale process, rolls of paper are typically loaded on a spindle at the "wet end" of a resin treater for impregnation with a resin. The high-grade (decorative) surface papers are treated with a clear resin, such as melamine resin, so as to not affect the surface (decorative) appearance of the paper. Since appearance is not critical for the brown paper, it may be treated with a colored resin such as phenolic resin.

Two methods are commonly used to impregnate the paper with resin. The usual way (and the fastest and most efficient) is called "reverse-roll coating." In this process, the paper is drawn between two big rollers, one of which applies a thin coating of resin to one side of the paper. This thin coating is given time to soak through the paper as it passes through to a drying oven. Almost all of the brown paper is treated by the reverse-roll process, because it is more efficient and permits full coating with less resin and waste.

Another way is a "dip and squeeze" process, in which the paper is drawn through a vat of resin, and then passed through rollers that squeeze off excess resin. The surface (decorative) papers are usually resin impregnated by the dip-and-squeeze process because, although slower, it permits a heavier coating of the impregnating resin for improving surface properties in the final laminate, such as durability and resistance to stains and heat.

After being impregnated with resin, the paper (as a continuous sheet) is passed through a drying (treater) ovens to the "dry end," where it is cut into sheets.

The resin-impregnated paper should have a consistent thickness to avoid unevenness in the finished laminate.

In the assembly of the laminate components, the top is generally the surface paper since what the finished laminate looks like depends mainly on the surface paper. A topmost "overlay" sheet that is substantially transparent when cured may, however, be placed over the decorative sheet, for example, to give depth appearance and wear resistance to the finished laminate.

In a laminate where the surface paper has light-hued solid colors, an extra sheet of fine, white paper may be paced beneath the printed surface sheet to prevent the amber-colored phenolic filler sheet from interfering with the lighter surface color.

The texture of the laminate surface is determined by textured paper and/or a plate that is inserted with the buildup into the press. Typically, steel plates are used, with a highly polished plate producing a glossy finish, and an etched textured plate producing a matte finish.

The finished buildups are sent to a press, with each buildup (a pair of laminates) is separated from the next by the above-mentioned steel plate. In the press, pressure is applied by hydraulic rams or the like. Low and high pressure methods are used to make paper laminates. Typically, at east 800 psi, and sometimes as much as 1,500 psi pressure is applied, while the temperature is raised to more than 250° F. by passing superheated water or steam through jacketing built into the press. The buildup is maintained under these temperature and pressure conditions for a time (typically about one hour) required for the resins in the resin-impregnated papers to re-liquefy, flow and cure, bonding the stack together into a single sheet of finished, decorative laminate.

Once removed from the press, the laminate sheets are separated and trimmed to the desired finished size. Typically the reverse side of the laminate is also roughened (such as by sanding) to provide a good adhesive surface for bonding to one or more substrates such as plywood, hardboard, particle board, composites and the like. The need for and choice of substrate and adhesive will depend on the desired end use of the laminate, as will be recognized by one of ordinary skill in the relevant art.

The examples which follow, description of illustrative and typical embodiments of the present disclosure are not intended to limit the scope of the disclosure. Various modifications, alternative constructions and equivalents may be employed without departing from the true spirit and scope of the appended claims.

EXAMPLES

Example 1

Process for Making Cationized Titanium Dioxide Slurry

A 35 wt. % aqueous slurry was made by charging a 500 mL stainless steel beaker with 156.6 g of demineralized water, 5.9 g of a 38% polyaluminum chloride solution, and 4.28 g of Kymene 617, a commercially available wet strength resin (WSR). The pH of this solution measured 3.28. 45 g of $TiO_2$ pigment (half of the total pigment addition) was added with stirring to make a pigment slurry. The pH was adjusted to 3.5 with 10% HCl. The remaining 45 g of $TiO_2$ pigment was added with stirring. The pH was adjusted upward to 5.0 by the addition of 10% NaOH solution. The isoelectric point (IEP) of 8.4 was measured for the pigment contained within.

Incorporating TiO2 Slurry Into a Décor Paper Composition

A stock mixture of paper pulp slurry was made by combining 45 g. of dry eucalyptus pulp in 1455 g of demineralized water (i.e. 3% solids). The mixture was further homogenized in a pulp disintegrator and the resulting slurry diluted to 0.625% solids with the addition of 7.2 L of demineralized water in an equalizer vessel. pH of the pulp slurry measured 5.7.

Hand Sheet Formation

Hand sheets were formulated for basis weights of 100-115 $g/m^2$ corresponding to a ladder of $TiO_2$ content ranging from 22-41%. Actual $TiO_2$ content of hand sheets was determined from the ash content of the paper. In a typical preparation, hand sheets containing 40% $TiO_2$ were fabricated by combining 339 g of pulp suspension with 5.7 g of cationized $TiO_2$ dispersion (from above) using low shear agitation, pH of this mixture was adjusted upward to pH 7.4 with 10% NaOH to induce pigment flocculation. An additional aliquot of Kymene WSR was added to the paper furnish to compensate for the higher fiber content in lower TiO$_2$-containing papers (i.e. equivalent basis weight). In this manner the total amount of WSR was held constant at 0.75% dry polymer solids weight relative to dry fiber weight. Hand sheets were formed from a commercial lab scale unit.

Hand Sheet Properties

Wet Tensile Strength Measurements

Strips cut from hand sheets (40% TiO2 content) were mounted and moistened on a TT-2703 horizontal tensile tester and the force applied to breakage was measured for each strip according to ISO 1924-2. Table 1 reports the average tensile strength from 5 strips. At equal pigment loading, décor papers made with cationized TiO$_2$ pigment dispersion had wet tensile strengths no worse than paper made with comparative pigment dispersion.

TABLE 1

| | handsheet | Dry basisweight (gsm) | Ash (% TiO2) | Wet Tensile Strength Average of 5 strips (Newton) | (SD) |
|---|---|---|---|---|---|
| Control | A | 102 | 40.3 | 2.58 | 0.54 |
| Example 1 | A | 111.2 | 40.5 | 2.92 | 0.46 |
| | B | 112.7 | 41 | 3.11 | 0.22 |

Laminate Process & Properties

Creation of a Décor Paper Laminate Panel Having Improved Appearance

Step 1: Using a laboratory impregnator, décor paper sheets from above were impregnated with a 50% aqueous solution of thermosetting melamine-formaldehyde resin. The paper sheets were dried and characterized by a volatility content of 6.5% by weight. The volatility content was determined by heating the resin-impregnated sheet at 160° C. for five minutes.

Step 2: A high pressure laminate sheet plate was made in the laboratory by stacking five sheets of kraft paper already impregnated with a thermosetting phenolic resin, together with the resin saturated sheet from Step 1, which is placed on top of the stack. The assembly was placed in a heated press and subjected to 150° C. temperature for 40 minutes at 10 MPa pressure.

Improved Appearance According to the DuPont Appearance Analyzer (DAA)

The appearance of the resulting laminate panels was measured using the commercially available DAA unit. The unit of measure, the DuPont appearance value (DAV2), quantifies the amplitude of surface peel (roughness) and thus a lower value corresponds to a smoother surface. Results from the table show that at high loading levels (i.e. >36 g/m$^2$ TiO$_2$) there is a trend toward improved appearance in laminate panels made from décor paper containing cationized TiO$_2$ dispersion. However, at lower loading levels, the appearance deteriorated when compared to the laminated control.

Comparative Example

Process for Titanium Dioxide Slurry Preparation

A 36.5 wt. % aqueous slurry was made by charging a 500 mL stainless steel beaker with 148 g of demineralized water and pH adjusted to 9.2-9.4 with the addition of 10% NaOH, 85 g of TiO2 was added by mixing with a Cowles blade at 1000 rpm. The slurry was then dispersed at 5000 rpm for 5 min. using a Dispermat mixer. Stirring was halted while the pH measurement was made. Again, pH was adjusted to 9.2-9.4 with the addition of 10% NaOH with gentle stirring and pH maintained for at least 1 minute. Agitation was continued for an additional 10 min. at 5000 rpm. An isoelectric point of 6.5 was measured for the pigment contained within.

Hand sheets were prepared by combining pulp-containing thinstock (mixture containing 0.625% pulp solids), 0.75% Kymene 617 (total amount determined on a dry solids/dry fiber basis), and adjusting the pH to 6.0 with 10% H$_2$SO$_4$. To produce a 100 g/m$^2$ basis weight sheet containing 40% TiO$_2$, 312 g of pulp suspension was added to 4.3 g of TiO2 slurry. An additional aliquot of Kymene WSR was added at this point to compensate for the higher fiber content in lower TiO$_2$-containing papers (i.e. equivalent basis weight). After mixing for 1 min under low shear, hand sheets were fabricated using an automatic sheet former.

A laminate panel was produced from the hand sheet according to Step 1 and Step 2 above. When the control was compared to the invention, opacity of a laminate panel made with comparative TiO$_2$ dispersion containing 39.7 g/m$^2$ TiO$_2$ by weight demonstrated equal opacity when compared to a laminate panel made with cationized TiO$_2$ dispersion. In this case 36 g/m$^2$ delivered the same opacity (93 by black/white hiding) and contained 10% less pigment by weight (see Table 2).

TABLE 2

| | Rutile TiO2 with added Metal Oxide Content | basis weight dry (gsm) | TiO2 amount (gsm) | Appearance DAV2/ black | Laminate Opacity Yblack/Ywhite (%) |
|---|---|---|---|---|---|
| Comparative Control | 8% | 101.6 | 39.7 | 77 | 92.61 |
| | 8% | 101.6 | 39.6 | 80 | 92.18 |
| | 8% | 102.4 | 36.6 | 87 | 92.83 |
| | 8% | 102.7 | 37.0 | 79 | 91.89 |
| | 8% | 102.9 | 33.3 | 88 | 90.73 |
| | 8% | 100.5 | 30.7 | 100 | 89.57 |
| | 8% | 103.2 | 29.3 | 88 | 89.05 |
| | 8% | 102.7 | 28.3 | 90 | 88.89 |
| | 8% | 103.2 | 25.0 | 108 | 87.46 |
| | 8% | 100.9 | 22.6 | 108 | 85.53 |
| Example 1 | 16% | 109.8 | 40.4 | 73 | 95.23 |
| | 16% | 110.3 | 36.7 | 81 | 93.19 |
| | 16% | 110.8 | 37.7 | 82 | 93.72 |
| | 16% | 110.6 | 32.8 | 104 | 92.47 |
| | 16% | 112.4 | 34.1 | 101 | 92.24 |
| | 16% | 104.6 | 23.5 | 164 | 85.68 |
| | 16% | 105.5 | 23.4 | 139 | 86.98 |

What is claimed is:

1. A paper laminate comprising a décor paper prepared from a dispersion having improved optical performance without negatively impacting mechanical strength, wherein the dispersion is made by a process comprising:
   (1) first contacting a treated TiO$_2$ particle having a surface area of at least about 30 m$^2$/g, and a cationic polymer to form a cationized TiO$_2$ particle slurry (a); wherein the treatment comprises an oxide of silicon, aluminum, or mixtures thereof; and the treatment is present in the amount of at least 15% based on the total weight of the treated titanium dioxide particle; and (2) subsequently contacting the cationized TiO$_2$ particle slurry with (b) paper pulp; and (c) a cationic polymer; wherein the cationic polymer in the slurry (a) and the cationic polymer in the dispersion (c) are compatible; wherein for equal optical performance, the amount of treated TiO$_2$ particle in the dispersion is reduced by about 10% when compared to a dispersion not comprising the treated TiO$_2$ particle of (a).

2. The paper laminate of claim 1 wherein the TiO$_2$ particle is a pigment.

3. The paper laminate of claim 1 wherein the cationic polymer in the slurry is a urea-formaldehyde resin, a melamine-formaldehyde resin, a cationic polyacrylamide polymer, a polydialkyllammonium polymer, a polyamide-polydialkylammonium polymer, or a polyimide-polyamine-epichlorhydrin resin.

4. The paper laminate of claim 1 wherein the cationic polymer (c) in the paper laminate is a urea-formaldehyde resin, a melamine-formaldehyde resin or a polyimide-polyamine-epichlorhydrin resin.

5. The paper laminate of claim 1 wherein the silica treatment level is at least about 6% by weight, based on the total weight of the treated TiO$_2$ particle.

6. The paper laminate of claim 1 wherein the alumina treatment level is about 4 to about 8%, based on the total weight of the treated TiO$_2$ particle.

7. The paper laminate of claim 1 wherein the TiO$_2$ particle has a particle size of about 0.02 to about 0.95 microns.

8. The paper laminate of claim 1 wherein the TiO$_2$ particle has a particle size of about 0.5 to about 0.75 microns.

9. The paper laminate of claim 1 wherein the TiO$_2$ particle is a pyrogenic TiO$_2$ particle.

10. The paper laminate of claim 9 wherein the silica is applied by deposition of pyrogenic silica onto a pyrogenic TiO$_2$ particle, co-oxygenation of silicon tetrachloride with titanium tetrachloride or by deposition via condensed phase aqueous oxide.

11. The paper laminate of claim 10 wherein the silica is applied by deposition via condensed phase aqueous oxide.

12. The paper laminate of claim 10 wherein the silica, alumina or both are substantially homogenous on the surface of the TiO$_2$ particle.

13. The paper laminate of claim 1 wherein the silica is applied by deposition via condensed phase aqueous oxide.

14. The paper laminate of claim 1 further comprising an opaque, cellulose pulp-based sheet.

15. The paper laminate of claim 14 wherein the opaque, cellulose pulp-based sheet is kraft paper.

16. The paper laminate of claim 1 further comprising an impregnating resin.

17. The paper laminate of claim 16 wherein the impregnating resin is a phenolic resin or a melamine resin.

18. The paper laminate of claim 1 wherein the cationic polymer (c) is present in the amount of about 0.5 to about 1.5% by weight, based on the total dry weight of the pulp used in the paper.

19. A process for making a paper laminate comprising:
(1) first contacting a treated TiO$_2$ particle having a surface area of at least about 30 m$^2$/g, and a cationic polymer to form a cationized TiO$_2$ particle slurry (a); wherein the treatment comprises an oxide of silicon, aluminum, or mixtures thereof; and the treatment is present in the amount of at least 15% based on the total weight of the treated titanium dioxide particle; and
(2) subsequently contacting the cationized TiO$_2$ particle slurry with (b) paper pulp; and (c) a cationic polymer to make a décor paper dispersion having improved optical performance without negatively impacting mechanical strength;
(3) forming a décor paper from the décor paper dispersion; and
(4) contacting a décor paper with a resin to form a paper laminate;
wherein the cationic polymer in the slurry (a) and the cationic polymer in the dispersion (c) are compatible; wherein for equal optical performance, the amount of treated TiO$_2$ particle in the dispersion is reduced by about 10% when compared to a dispersion not comprising the treated TiO$_2$ particle of (a).

* * * * *